(12) United States Patent
Ortt et al.

(10) Patent No.: US 7,513,029 B2
(45) Date of Patent: Apr. 7, 2009

(54) TOOL FOR MANUFACTURING COILS FOR DYNAMOELECTRIC MACHINES AND METHOD THEREFOR

(75) Inventors: Earl M. Ortt, Bel Air, MD (US); David E. Abbott, Manchester, MD (US); John R. Cochran, Baltimore, MD (US); Garrett P. McCormick, Manchester, MD (US)

(73) Assignee: Black & Decker Inc., Newark, DE (US)

( * ) Notice: Subject to any disclaimer, the term of this patent is extended or adjusted under 35 U.S.C. 154(b) by 220 days.

(21) Appl. No.: 11/344,820

(22) Filed: Feb. 1, 2006

(65) Prior Publication Data

US 2006/0207082 A1 Sep. 21, 2006

Related U.S. Application Data

(60) Provisional application No. 60/649,218, filed on Feb. 2, 2005.

(51) Int. Cl.
*H02K 15/10* (2006.01)
(52) U.S. Cl. .............................. 29/596; 29/605; 29/606; 29/732; 310/179
(58) Field of Classification Search ........... 29/596–598, 29/732–737, 605–609; 310/215–21, 194, 310/179, 8; 242/363, 475.7; 336/230; 72/137, 72/142
See application file for complete search history.

(56) References Cited

U.S. PATENT DOCUMENTS

| 3,612,930 | A | * | 10/1971 | Raby .......................... 310/218 |
| 4,130,929 | A | * | 12/1978 | Dzus ........................... 29/456 |
| 4,131,988 | A | * | 1/1979 | Finegold ..................... 29/596 |
| 4,852,246 | A | * | 8/1989 | Rochester .................... 29/596 |
| 6,057,625 | A | * | 5/2000 | Stockman et al. ........... 310/215 |
| 6,713,929 | B2 | * | 3/2004 | Meyer et al. ................ 310/216 |
| 7,146,706 | B2 | * | 12/2006 | Du et al. ...................... 29/596 |
| 7,252,118 | B2 | * | 8/2007 | Reid .......................... 140/92.1 |

FOREIGN PATENT DOCUMENTS

JP            56-10053      *    2/1981

* cited by examiner

*Primary Examiner*—Minh Trinh
(74) *Attorney, Agent, or Firm*—Michael Aronoff; Adan Ayala

(57) ABSTRACT

A tool and method for winding and forming a field coil for field assembly, such as a stator, includes separable tool halves defining a winding cavity therebetween. The winding cavity receives magnet wire that is wound therein, such as by rotating the tool or a winding nozzle. The magnet wire generally conforms to the shape of the winding cavity such that when the tool halves are separated, a field coil having a net shape is produced. Once the magnet wire is sufficiently deposited within the winding cavity, wires of the coil may be bonded together either through a resistive heating process such as by passing an electrical current through the coil or through other heating or chemical bonding methods to thereby maintain the net shape of the field coil once it is removed from the tool.

11 Claims, 5 Drawing Sheets

TOOL FOR MANUFACTURING COILS FOR DYNAMOELECTRIC MACHINES AND METHOD THEREFOR

CROSS-REFERENCE TO RELATED APPLICATIONS

This application claims the benefit of U.S. Provisional Application No. 60/649,218 filed on Feb. 2, 2005. The disclosure of the above application is incorporated herein by reference.

FIELD OF THE INVENTION

The present invention relates to manufacturing coils for dynamoelectric machines, and more particularly to improved coil winding tooling and method of using it.

BACKGROUND OF THE INVENTION

Dynamoelectric machines are machines that generate electric power or use electric power. Common types of dynamoelectric machines are alternators, generators, and electric motors.

Electric motors are used in a wide variety of applications involving power tools such as drills, saws, sanding and grinding devices, and yard tools such as edgers and trimmers, just to name a few. These devices all make use of electric motors having an armature and a field, such as a stator.

FIG. 1 shows a typical prior art stator 100 for an electric motor. Stator 100 is formed from a lamination stack 102 within which a plurality of windings of magnet wires 104 are wound to form field coils 114. Lamination stack 102 is formed by stacking together an appropriate number of individual laminations 108 and welding them together. The individual laminations 108 are typically made by stamping them from steel. To do so, loose laminations 108 are loaded in a stacker. The stacker picks up the appropriate number of laminations 108 and places them in a fixture where they are welded together. The laminations 108 are formed with slots so the resulting lamination stack 102 has slots 110 in which the magnet wires 104 are wound.

Magnet wires, as that term is commonly understood, are wires of the type conventionally used to wind coils in electric machines, such as armatures and stators. Prior to winding the magnet wires 104, insulating sleeves or insulating slot liners (not shown), such as vulcanized fiber, are placed in the slots 110 and end rings 112 are placed on the lamination stack 102. End rings 112 are illustratively made of plastic and formed to include coil forms 116. Field coils 114 are then wound by winding the magnet wires 104 in the slots 110. After the field coils 114 are wound, the end of the magnet wires 104 are appropriately terminated, such as to terminals 118 in a terminal post 120. The magnet wires 104 are then bonded together, such as by the application of heat when bondable magnet wires are used.

Bondable magnet wires are magnet wires layered with a heat activated thermoplastic or thermoset polymer adhesive. One type of bondable magnet wires commonly used is wire available under the trade name BONDEZE from Phelps Dodge of Fort Wayne, Ind. Alteratively, the magnet wires 104 may be bonded by a trickle resin process described below. Where the stator 100 will be used in an application that exposes it to a particularly abrasive environment, such as a grinder, an epoxy coating is applied to the field coils 114 for abrasion protection.

In the manufacturing process for the stator described above, once the magnet wires have been wound in the slots and the ends of the magnet wires terminated, the magnet wires are bonded, if bondable wire is being used, and a "trickle" resin is applied over the magnet wires, if trickle resin is being used. The process of applying the trickle resin is a somewhat difficult process to manage to obtain consistent results. It also has a number of drawbacks, not the least of which is the cost and difficulty of performing it with reliable, consistent results.

Initially, the trickle process requires the use of a relatively large and expensive oven to carefully preheat the partially assembled stators to relatively precise temperatures before the trickle resin can be applied. The temperature of the trickle resin also needs to be carefully controlled to achieve satisfactory flow of the resin through the slots in the lamination stack. It has proven to be extremely difficult to achieve consistent, complete flow of the trickle resin through the slots in the lamination stack. As such, it is difficult to achieve good flow between the magnet wires with the trickle resin. A cooling period must then be allowed during which air is typically forced over the stators to cool them before the next manufacturing step is taken. Further complicating the manufacturing process is that the trickle resin typically has a short shelf life, and therefore must be used within a relatively short period of time.

The end result is that stators must often be designed for the process as opposed to optimum performance and cost.

SUMMARY OF THE INVENTION

A tool for forming a field coil for a field assembly, such as a stator, in accordance with the invention has separable tool halves defining a winding cavity therebetween. The winding cavity receives magnet wire that is wound therein. The magnet wire generally conforms to the shape of the winding cavity such that when the tool halves are separated, a field coil having a net shape is produced.

In an aspect, once the magnet wire is sufficiently deposited within the winding cavity, the coil is bonded either through a resistive heating process, such as by passing an electrical current through the coil, or through other heating or chemical bonding methods to thereby maintain the net shape of the field coil once it is removed from the tool.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
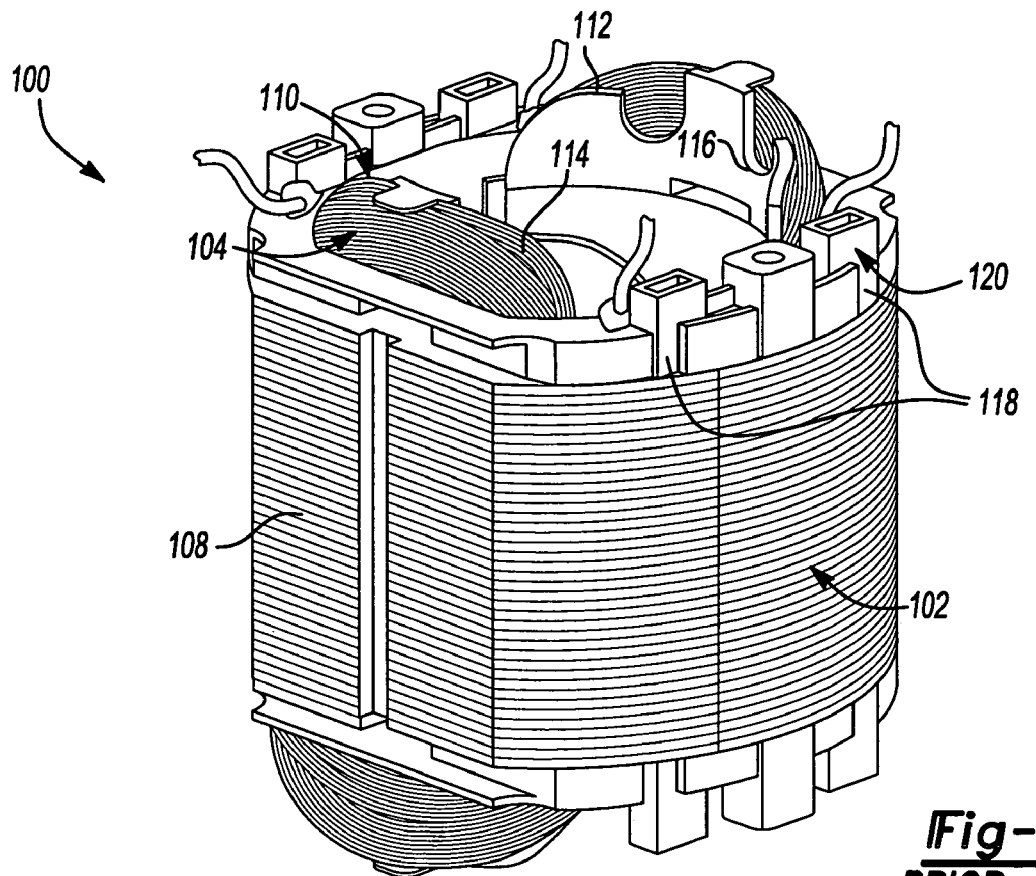
FIG. 1 is a perspective view of a prior art stator.
Figure 2:
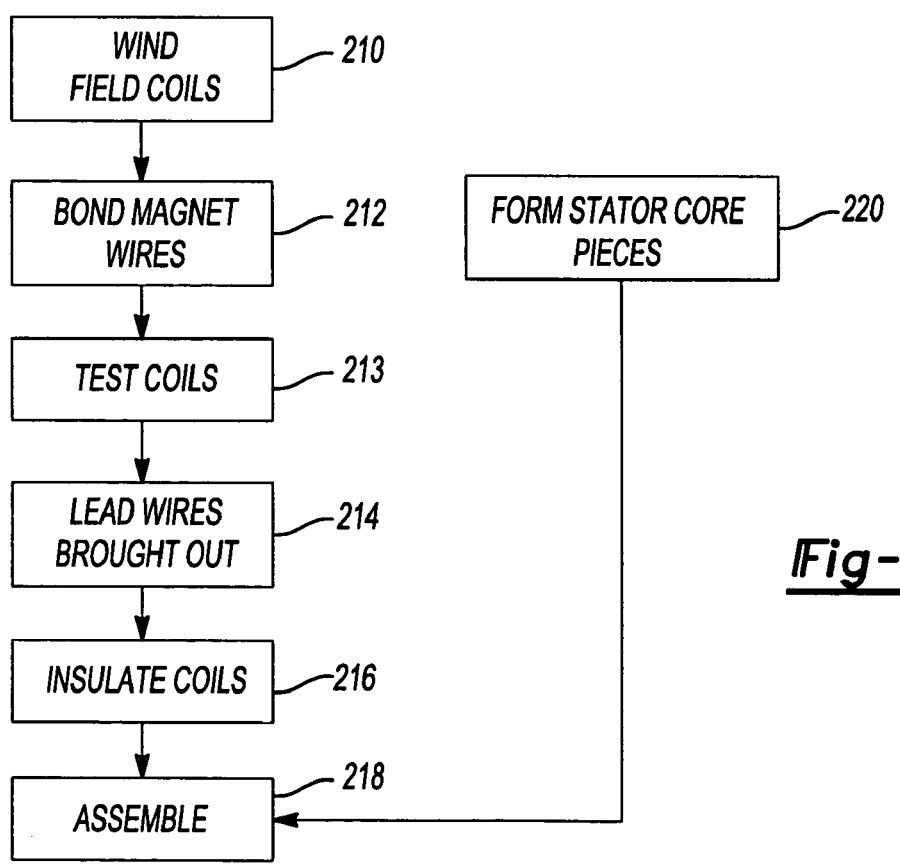
FIG. 2 is a flow chart of a method for forming a stator with pre-formed field coils that are formed in accordance with an aspect of the invention.
Figure 3:
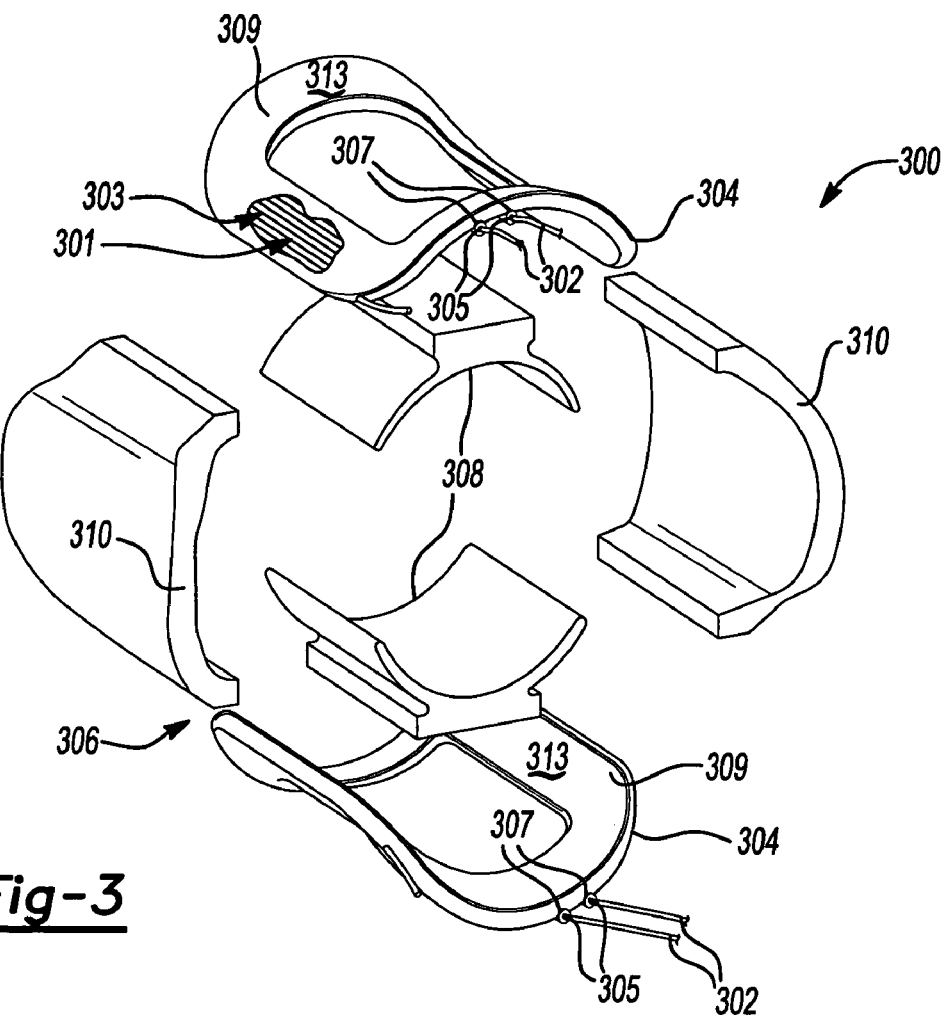
FIG. 3 is an exploded assembly view of a stator having pre-formed field coils formed in accordance with the method of FIG. 2.
Figure 4:
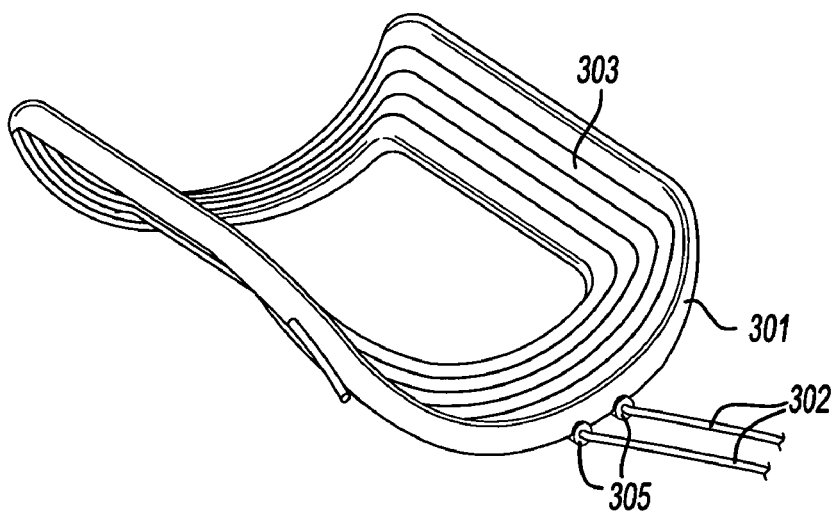
FIG. 4 is a perspective view of a pre-formed field coil prior to molding.
Figure 5:
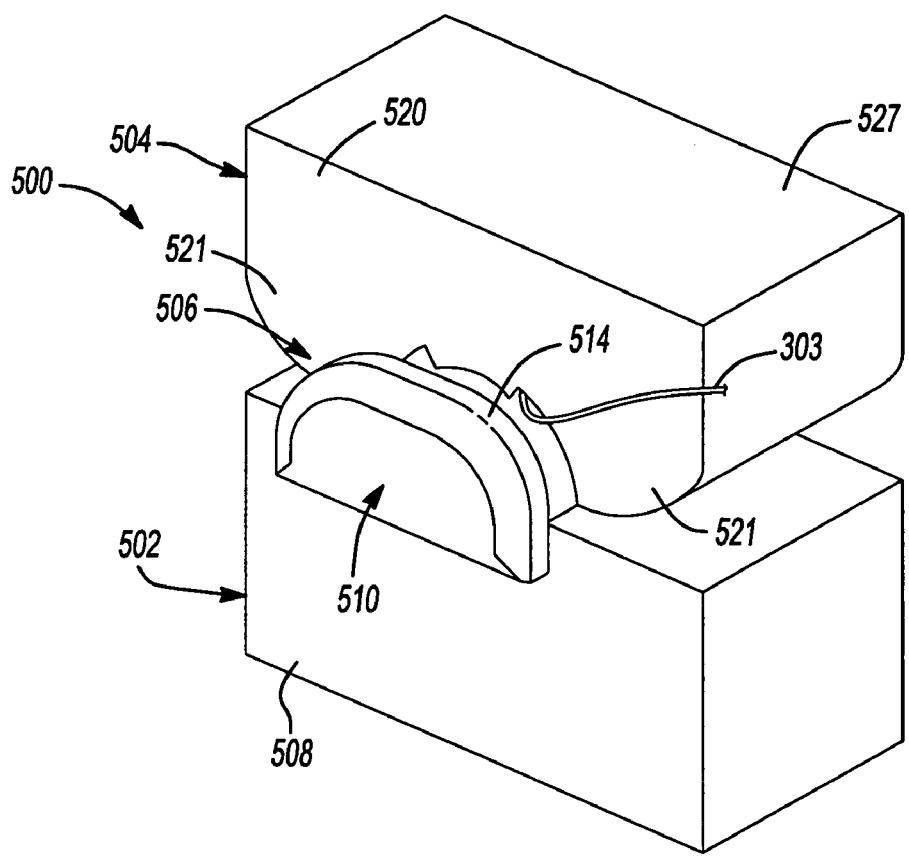
FIG. 5 is a perspective view of a coil tool for forming a field coil in accordance with an aspect of the present invention.

The following description of the preferred embodiment(s) is merely exemplary in nature and is in no way intended to limit the invention, its application, or uses.

Referring to FIGS. 2-9, a process for making a field assembly, such as stator 300 is shown. At step 210, a coil, such as coil 301, for field coils 304 of stator 300 is wound to a predetermined shape, preferably net shape, by winding magnet wires 303 to the predetermined shape. "Net shape" means the final shape of the field coils 304 in an assembled stator 300. At step 212, the magnet wires 303 are bonded together. The magnet wires 303 are preferably bondable magnet wires, such as BONDEZE wires, having a layer of heat activated thermoplastic or thermoset adhesive thereon and heat is applied to the formed coil 301 to activate the adhesive on the magnet wires 303 to bond them together.

Field coils 304 have coil ends 305 with lead wires 302 extending therefrom which are brought out at step 214 from the formed coil 301. Lead wires 302 can be brought out using different alternatives. Coil ends 305 may illustratively be terminated at terminals 307 and lead wires 302 attached to the terminals 307. Lead wires 302 can be attached directly to coil ends 305. Lengths of coil ends 305 can be insulated by various methods, such as shrink tubing, various wall thickness TFE or PTFE tubing, and the insulated lengths provide the lead wires 302. The use of tubing, such as TFE or PTFE tubing, in addition to insulating the coil ends 305, further provides the advantages of strain relief and added rigidity to lead wires 302. Sliding tubing such as TFE or PTFE tubing over the coil ends 305 shields them and the tubing can be retained by any type of end termination.

At step 216, the formed coil 301 is insulated to form field coil 304. The formed coil 301 can be insulated by encapsulating it with an encapsulation material 309 that forms an encapsulation 313. The encapsulation material 309 is illustratively an elastomeric thermoplastic or thermoset plastic, such as thermoset liquid silicon rubber. Encapsulation material 309 is illustratively injection molded around field coils 304. It should be understood that other processes and materials can be used to encapsulate the formed and bonded coils with encapsulation material 309, such as transfer molding or spraying the encapsulation material 309. The encapsulation material could also be a more rigid thermoset. The encapsulation material may illustratively be thermally conductive and could also be a more rigid type of thermally conductive plastic, such as a Konduit® thermoplastic commercially available from LNP Engineering Plastics (GE Plastics) of Exton, Pa. The encapsulation material may illustratively be applied using the known vacuum impregnation process. The formed field coil 301 would be placed in a vacuum chamber and the encapsulation material wicks onto the field coil 301. It should be understood that the coil 301 can be insulated in ways other than encapsulation, such as with paper insulation wrapped or otherwise disposed around it.

Insulated field coils 304 are assembled with stator core pieces 306 to form stator 300, as shown in step 218. Stator core pieces 306 include pole pieces 308 and back iron or return path pieces 310.

With particular reference to FIGS. 5-9, a coil forming or winding tool 500 in accordance with the invention for use in forming the field coils 301 will be described in detail. The tool 500 includes a male tool half 502 and a female tool half 504. The male tool half 502 is matingly received by the female tool half 504 such that a winding cavity 506 is formed generally therebetween.

The male tool half 502 includes a main body 508 and a projection 510 extending from the main body 508. Projection 510 may illustratively be integrally formed with main body 508, or it may be a separate part that is affixed to main body 508. The main body 508 may illustratively include a plurality of attachment apertures 512 (FIG. 8) formed on a face 513 that aid in selectively fixing the male tool half 502 to a winding machine (not shown). The projection 510 includes a generally arcuate surface 515 (FIG. 7) extending between shoulders 516 of projection 510 with a recess 518 illustratively in the center thereof. The arcuate surface 515 cooperates with the female tool half 504 to define the winding cavity 506 with the recess 518 matingly receiving a projection 524 of the female tool half 504 to properly align the female tool half 504 with the male tool half 502, as will be described further below. It should be understood, however, that the male tool half could include projection 524 and the female tool half include recess 518.

The female tool half 504 includes a main body 520 having opposed shoulders 521 having arcuately inwardly facing surfaces 523 (FIG. 8) that together define a generally arcuate concave surface 528. Arcuate surface 528 cooperates with arcuate surface 515 of the male tool half 502 to define the winding cavity 506. Main body 520 also has projection 524 extending from main body 520 illustratively at a center between opposed shoulders 521. Projection 524 may illustratively be formed integrally with main body 520 or may be a separate piece that is affixed to main body 520. The main body 520 may also illustratively include a plurality of attachment apertures 526 formed on a face 527 generally opposite from the projection 524 to aid in attachment of the female tool half 504 to a winding machine (not shown).

It should be understood that tool 500 can be secured in the winding machine in other ways. For example, tool 500 may be provided with a self locking mechanism, such as a twist-lock mechanism, so that male and female tool halves 502, 504 can be locked together and tool 500 then placed in the winding machine.

It should be understood that tool 500 can be configured so that the formed coil 301 is not symmetrical. For example, formed coil 301 may have end coils of different shapes. In which case, the elements of male and female tool halves 502, 504 are configured to provide the desired shape of formed coil 301. Projection 524 of female tool half 504 and recess 518 of male tool half 502 may then not be centrally located in their respective tool halves.

In operation, the male and female tool halves 502, 504 are fixedly attached to a winding machine by fasteners (not shown) inserted into attachment apertures 512, 526, respectively. The tool halves 502, 504 are aligned in the tool 500 such that the recess 518 of the male half 502 opposes the projection 524 of the female half 504. When the winding machine brings the tool halves 502, 504 together, the projection 524 is seated within the recess 518 to align the tool halves

502, 504. Alternatively, as discussed above, male and female tool halves 502, 504 may be placed in the winding machine after being locked together.

Once the projection 524 is fully received by the recess 518, the tool 500 is in a closed position. At this point, the arcuate surface 515 of the male tool half 502 opposes the concave surface 528 of the female tool half 504 such that a gap is formed between the two tool halves 502, 504. The gap defines the winding cavity 506 in which the magnet wire 303 is wound during formation of the field coils 301, as will be described further below. Alternatively, the two tool halves 502 and 504 may be secured together by alternate means such as screws (not shown), and then inserted and aligned into the winding machine for winding. After the winding step 210 is completed, the tooling can be removed from the machine for the bonding operation 212. Alternatively, the bonding operation may be performed prior to removing the tool 500 from the winding machine.

With particular reference to FIGS. 5-9, the operation of the tool 500 is described. The magnet wire 303 is inserted into the winding cavity 506 of tool 500. The leading end of the magnet wire 303 is secured. It may be secured to tool 500 such as by securing it to a tool half 502, 504, or by clamping it between tool halves 502, 504 as the winding machines closes the tool 500 (i.e., moves the tool halves 502, 504 in direction Z of FIG. 6). It may otherwise be secured such as by as by clamping it to an element of the winding machine. At this point, the magnet wire 303 is prevented from disengaging the tool 500.

Figure 6:
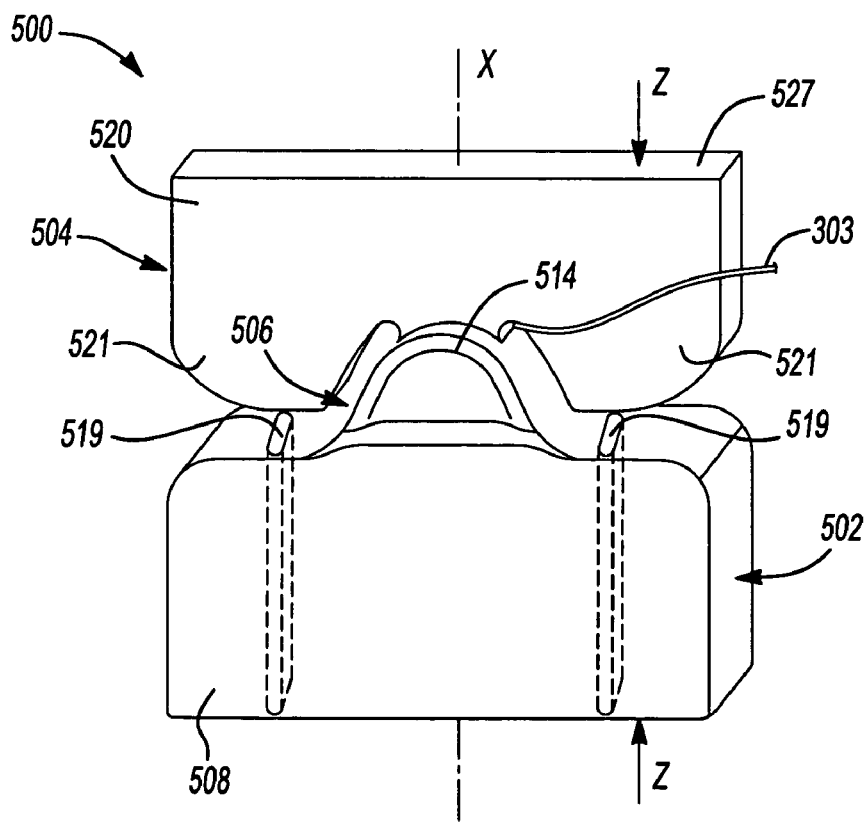
FIG. 6 is a front view of the coil tool of FIG. 5.
Figure 7:
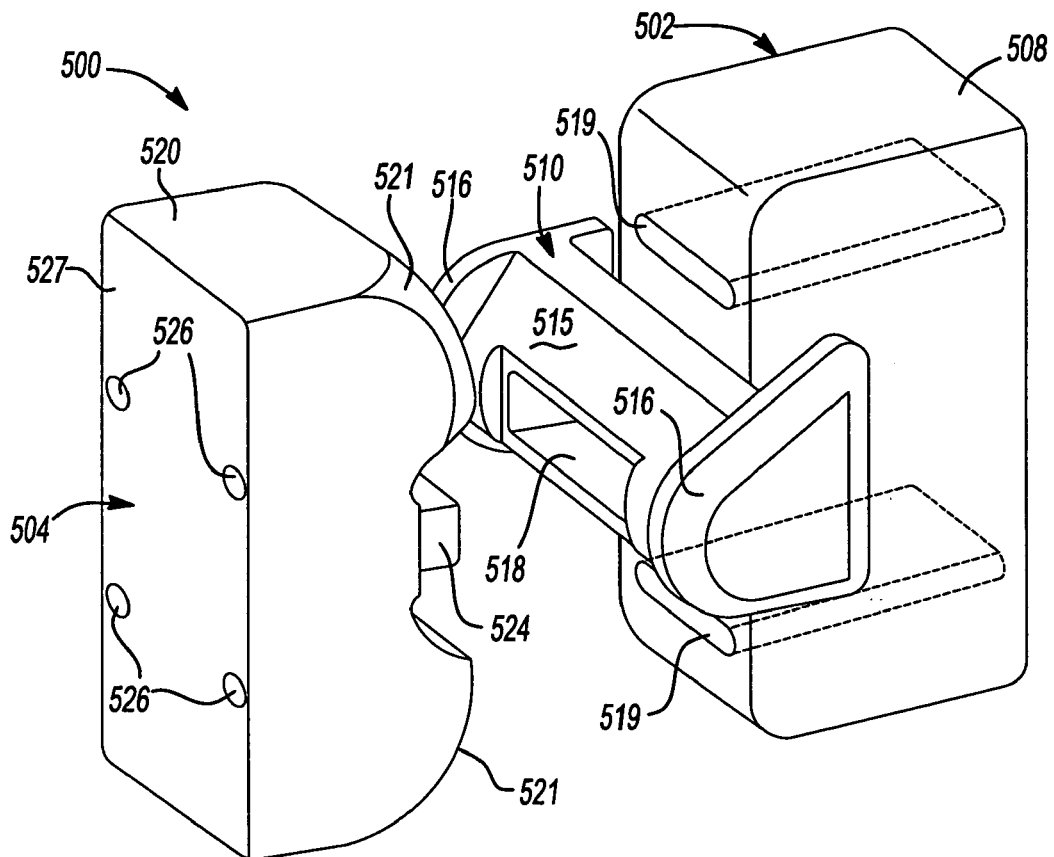
FIG. 7 is an exploded view of the coil tool of FIG. 5 oriented to show a perspective view of a male tool half.
Figure 8:
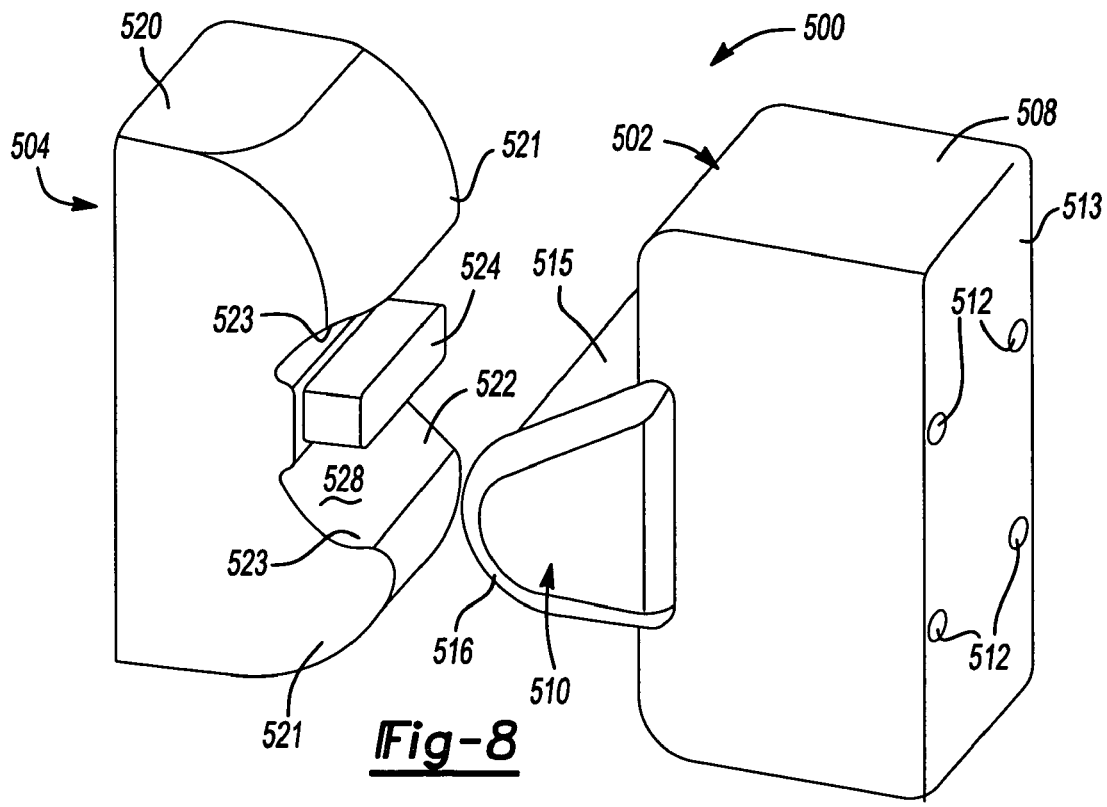
FIG. 8 is an exploded view of the coil tool of FIG. 5 oriented to show perspective view of a female tool half.
Figure 9:
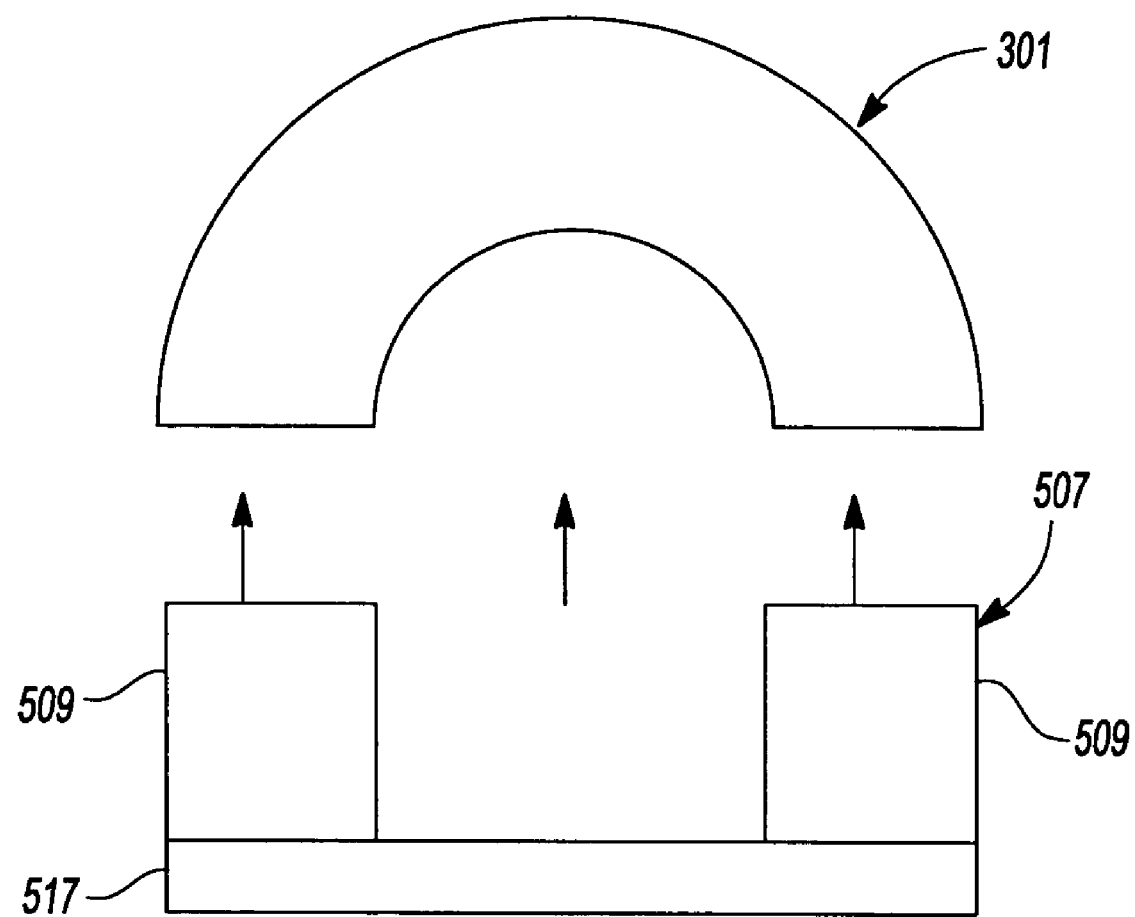
FIG. 9 is a side view of a forming tool used in compression of a field coil.

Once an end of the magnet wire 303 is secured to the tool 500, the winding machine rotates the tool 500 about axis "X" (FIG. 6). Rotation of the tool 500 about axis X causes the magnet wire 303 to be placed under tension. The tensile force exerted on the magnet wire 303, due to rotation of the tool 500, causes the magnet wire 303 to wrap around the projections 510, 524 and begin to fill the winding cavity 506. It should be understood that the tool 500 could be kept stationary and a winding nozzle rotated about tool 500 to wrap the magnet wire 303.

The tool 500 (or the winding nozzle) is continuously rotated until the desired number of turns of magnet wire 303 is achieved in the coil 301, thus filling the winding cavity 506. The winding of magnet wire 303 is then stopped and an outermost portion, referred to as a trailing edge, of the magnet wire 303 in the winding cavity 506 is secured. The trailing edge of magnet wire 303 may be secured to the tool 500, such as by securing it to a tool half 502 or 504, or otherwise secured such as by clamping it to an element of the winding machine. The magnet wire 303 is then cut from the wire supply (i.e., spool, etc.).

The magnet wire 303 is wound around the projections 510, 524 and has a wound shape similar to that of the winding cavity 506. At this point, winding and forming of the magnet wire 303 is substantially complete and takes the basic form of the coil 301.

Coil 301 may preferably be bonded prior to separation of the tool halves 502, 504 and removal from the tool 500. Magnet wire 303 of coil 301 is bonded together either by sending a current through the wire 303 (i.e., resistance heating) or by chemically bonding, as previously discussed. It should be understood that while the magnet wire 303 has been described as being bonded while the coil 301 is still in the tool 500, it should be understood that the coil 301 could alternatively be bonded after the coil 301 has been removed from the tool 500. However, it should be further noted that one advantage of bonding the magnet wire 303 when the coil 301 is still in the tool 500 is that it ensures that the coil 301 maintains its precise shape when it is removed from the tool 500. The coils 301 may also be compressed during bonding to minimize the air gaps between the magnet wires, resulting in improved heat transfer between adjacent magnet wires 303 and improved bonding strength between adjacent magnet wires 303, and increasing slot fill when coil 301 is placed in a slot of a field.

Compression of the coil 301 may be accomplished by the winding machine exerting a compressive force on the tool halves 502, 504 in the Z direction once the magnet wire 303 has sufficiently filled the winding cavity. As can be appreciated, further compression of the tool halves 502, 504 in the Z direction causes the projection 524 to traverse farther into the recess 518 and thereby move the tool halves 502, 504 closer together thus applying a compressive force a coil 301.

Alternatively, the two halves 502, 504 could be completely compressed during winding and bonding through interaction of a forming tool 507 (FIG. 9) with the coil 301. The forming tool 507 includes a pair of forming blades 509 that are interconnected by a cross-member 517. The forming blades 509 are inserted through slots 519 (FIG. 7) in the male tool half 502 of the tool 500 and engage the coil 301. The blades 509 enter the tool 500 and compress the coil 301, illustratively just after the bonding current is stopped while the thermoplastic bonding layer (adhesive) is still in the softened state, thereby compressing the coil 301 while still in the tool 500. The coil 301 may also be compressed while it is still being heated.

It should be understood that the forming tool may illustratively be part of one or both male and female tool halves 502, 504. For example, forming blades similar in shape to forming blades 509 may illustratively be entrained in slots 519 of male tool half 502 and urged against magnet wire 303 at an appropriate point in the winding cycle.

Once formation of the coil 301 is complete, the forming tool 507 is removed from slots 519, the tool halves 502, 504 are separated, and the coil 301 is removed from the tool 500. At this point, assuming that the coil 301 was bonded in the tool 500, the coil 301 is complete and is ready for testing at step 213 prior to being assembled into the stator 300.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of forming a coil for a dynamoelectric machine, comprising:
    a) mating a male tool half of a coil winding tool with a female tool half of the coil winding tool where the female tool half has a concave surface that faces an arcuate surface of a projection of the male tool half, the concave surface of the female tool half spaced from the arcuate surface of the projection of the male tool half when the male and female tool halves are mated together defining a winding cavity therebetween;
    b) securing a leading edge of a magnet wire;
    c) winding magnet wire around the projection of the male tool half to fill the winding cavity with magnet wire to form the coil; and
    d) bonding the magnet wire together in the winding cavity before removing the coil from the coil winding tool that includes applying electric current to the magnet wire to heat it to activate heat activated adhesive on the magnet wire.

2. The method of claim 1 wherein winding the magnet wire includes rotating the winding tool.

3. The method of claim 1 including bonding the magnet wire in the winding cavity after removing the coil winding tool from a winding machine.

4. The method of claim 1 including bonding the magnet wire in the winding cavity before removing the coil winding tool from a winding machine.

5. The method of claim 1 including compressing the magnet wire in the winding cavity.

6. The method of claim 5 wherein compressing the magnet wire in the winding cavity includes urging the male and female tool halves together to apply compressive force on the magnet wire in the winding cavity.

7. A method of forming a coil for a dynamoelectric machine, comprising:
- a) mating a male tool half of a coil winding tool with a female tool half of the coil winding tool where the female tool half has a concave surface that faces an arcuate surface of a projection of the male tool half, the concave surface of the female tool half spaced from the arcuate surface of the projection of the male tool half when the male and female tool halves are mated together defining a winding cavity therebetween;
- b) securing a leading edge of a magnet wire;
- c) winding magnet wire around the projection of the male tool half to fill the winding cavity with magnet wire to form the coil; and compressing the magnet wire in the winding cavity that includes inserting a forming tool into the winding cavity and urging it against the magnet wire to exert compressive force against the magnet wire.

8. The method of claim 7 wherein inserting the forming tool into the winding cavity includes inserting a pair of forming blades on the forming tool into the winding cavity and against the magnet wire.

9. The method of claim 7 including bonding the magnet wire in the winding cavity together before removing the coil from the coil winding tool.

10. The method of claim 9 wherein bonding the magnet wire in the winding cavity includes applying electric current to the magnet wire to heat it to activate heat activated adhesive on the magnet wire.

11. A method of forming a coil for a dynamoelectric machine, comprising:
- a) mating a male tool half of a coil winding tool with a female tool half of the coil winding tool where the female tool half has a concave surface that faces an arcuate surface of a projection of the male tool half, the concave surface of the female tool half spaced from the arcuate surface of the projection of the male tool half when the male and female tool halves are mated together defining a winding cavity therebetween;
- b) securing a leading edge of a magnet wire;
- c) winding magnet wire around the projection of the male tool half to fill the winding cavity with magnet wire to form the coil; and compressing the magnet wire in the winding cavity that includes urging forming blades entrained in at least one of the male and female tool halves against the magnet wire to exert compressive force against the magnet wire.

* * * * *